United States Patent
Kondo

(10) Patent No.: US 7,155,454 B2
(45) Date of Patent: Dec. 26, 2006

(54) FILE MANAGEMENT METHOD AND PROGRAM THAT MANAGE MULTIPLE FILES AS SINGLE COMBINATION FILE

(75) Inventor: Atsushi Kondo, Osaka (JP)

(73) Assignee: Minolta Co., Ltd., Osaka (JP)

( * ) Notice: Subject to any disclaimer, the term of this patent is extended or adjusted under 35 U.S.C. 154(b) by 281 days.

(21) Appl. No.: 10/201,286

(22) Filed: Jul. 24, 2002

(65) Prior Publication Data

US 2003/0028553 A1   Feb. 6, 2003

(30) Foreign Application Priority Data

Aug. 2, 2001   (JP)   ............................. 2001-234657

(51) Int. Cl.
*G06F 7/00*   (2006.01)
*G06F 17/00*   (2006.01)
(52) U.S. Cl. .................... 707/104.1; 707/100
(58) Field of Classification Search ............ 707/1–205; 715/511, 514–516
See application file for complete search history.

(56) References Cited

U.S. PATENT DOCUMENTS

| | | | |
|---|---|---|---|
| 5,544,302 A * | 8/1996 | Nguyen ..................... 715/837 |
| 5,801,844 A * | 9/1998 | Yamakawa et al. ......... 358/450 |
| 6,026,416 A | 2/2000 | Kanerva et al. ............ 707/515 |
| 6,035,308 A * | 3/2000 | Yano et al. ............... 715/501.1 |
| 6,212,512 B1 * | 4/2001 | Barney et al. ................. 707/1 |
| 6,421,685 B1 * | 7/2002 | Nishikawa ................... 707/201 |
| 6,493,731 B1 * | 12/2002 | Jones et al. .............. 715/501.1 |
| 6,629,081 B1 * | 9/2003 | Cornelius et al. ............. 705/30 |
| 6,820,094 B1 * | 11/2004 | Ferguson et al. ........... 707/200 |
| 6,876,988 B1 * | 4/2005 | Helsper et al. ............... 706/21 |
| 2001/0056434 A1 * | 12/2001 | Kaplan et al. ........... 707/104.1 |
| 2002/0007373 A1 * | 1/2002 | Blair et al. ................. 707/505 |
| 2002/0055946 A1 * | 5/2002 | Prager et al. ............... 707/500 |
| 2003/0164856 A1 * | 9/2003 | Prager et al. ............... 345/764 |

FOREIGN PATENT DOCUMENTS

JP           07-319751        12/1995

* cited by examiner

*Primary Examiner*—Don Wong
*Assistant Examiner*—Linh Black
(74) *Attorney, Agent, or Firm*—Buchanan Ingersoll & Rooney PC

(57) ABSTRACT

A file which is virtually combined multiple files (a virtual combination file) is displayed as a thumbnail S. The part 'A' indicates the number of files that are virtually combined and the number of the file currently being displayed as a thumbnail S. The user can change the file that is displayed as a thumbnail S by operating the part 'A'. The part 'B' indicates the number of files that are related to and grouped with the file being displayed as a thumbnail S and the number of the file currently being displayed as a thumbnail S. The user can easily keep track of the files that are virtually combined and the files that are registered as belonging to the same group as any of these files.

22 Claims, 10 Drawing Sheets

Fig. 8

| Display Flag | File Name | Combination File | Virtual Combination Flag | Order in Virtual Combination File | Order in Variation or History File | Type |
|---|---|---|---|---|---|---|
| 0 | A.DOC | 1 | 1 | 1 | -- | -- |
| 1 | B.XLS | 1 | 1 | 2 | -- | -- |
| 0 | REV1_C.PPT | 1 | 1 | 3 | 1 | History |
| 0 | REV2_C.PPT | 1 | -- | 3 | 2 | History |
| 0 | REV3_C.PPT | 1 | -- | 3 | 3 | History |
| 0 | VAR_A.TXT | 2 | -- | 1 | 1 | Variation |
| 1 | VAR_B.TXT | 2 | 1 | 1 | 2 | Variation |
| 0 | VAR_C.TXT | 2 | -- | 1 | 3 | Variation |

FILE MANAGEMENT METHOD AND PROGRAM THAT MANAGE MULTIPLE FILES AS SINGLE COMBINATION FILE

This application is based on application No. 2001-234657 filed in Japan, the content of which is hereby incorporated by reference.

BACKGROUND OF THE INVENTION

1. Field of the Invention

The present invention relates to a file management program, a computer-readable recording medium on which the file management program is recorded, and a file management method, and more particularly, to a file management program, a computer-readable recording medium on which the file management program is recorded, and a file management method that can combine multiple files into a single file and that can perform file history and variation management.

2. Description of the Related Art

In the conventional art, a graphical user interface (hereinafter 'GUI') has been incorporated into personal computers in order to improve convenience of operation. A GUI displays as thumbnails, which are reduced-size images, images that become available when the data for image files or document files is opened, and allow the user to easily recognize the content of the file. In addition, multiple files created using different applications, such as image files and document files, are associated with each another (this type of processing is called 'virtual combination'), and are displayed as a virtual single file using a thumbnail. In this case, the multiple files are sequentially displayed on the thumbnail screen via page-forwarding.

Where a reference material is created using a computer, multiple documents are usually revised and saved two or more times, and each completed document is assembled. Because multiple versions are created for each file before the document is finally completed in this fashion, history management must be performed. In addition, in the situation in which the same invoice is sent to multiple companies, multiple documents (variations) which are the same text but different addressees may be prepared.

However, while the conventional virtual combination has the function of combining multiple document files, it does not have the function of managing the history or the variations of each document file. In other words, where a document has been revised, for example, because the file name stays the same before and after the revision, the old file is overwritten and is deleted. Consequently, the user must separately manage the file history or variations, which is troublesome for the user.

SUMMARY OF THE INVENTION

The present invention is created in order to resolve the problem identified above, and an object thereof is to provide a file management program, a computer-readable recording medium on which the file management program is recorded, and a file management method that can easily perform file management.

In order to attain the above object, in accordance with one aspect of the present invention, a computer program that causes a computer to execute a file management program, including steps of: combining multiple files into a single file based on information that indicates relationship among the multiple files (first combining); combining at least one file, which is a component of the combination file, and other files that are related to said file (second combining); and managing the files combined in the first combining step and the files combined in the second combining step, associated with each other.

According to another aspect of the present invention, the file management program described above is recorded on a computer-readable recording medium.

According to yet another aspect of the present invention, a method for file management, including steps of: combining multiple files into a single file based on information that indicates relationship among the multiple files (first combining); combining at least one file, which is a component of the combination file, and other files that are related to said file (second combining); and managing the files combined in the first combining step and the files combined in the second combining step, associated with each other.

According to still another aspect of the present invention, a computer program that causes a computer to execute a file management program, including steps of: combining multiple files into a single file in response to an instruction from a user; combining at least one file, which is a component of the combined file, and other files that are related to the one file; combining and managing the files combined in the first combining and the files combined in the second combining; and displaying contents of one file from among the multiple files in the combined file and information that indicates relationship between the file displayed and other combined files.

BRIEF DESCRIPTION OF THE DRAWINGS

These and other objects and features of this invention will become clear from the following description, taken in conjunction with the preferred embodiments with reference to the accompanied drawings in which:

FIG. 8 is a drawing by which to explain the content of a management information file;

DETAILED DESCRIPTION OF THE PREFERRED EMBODIMENTS

Figure 1:
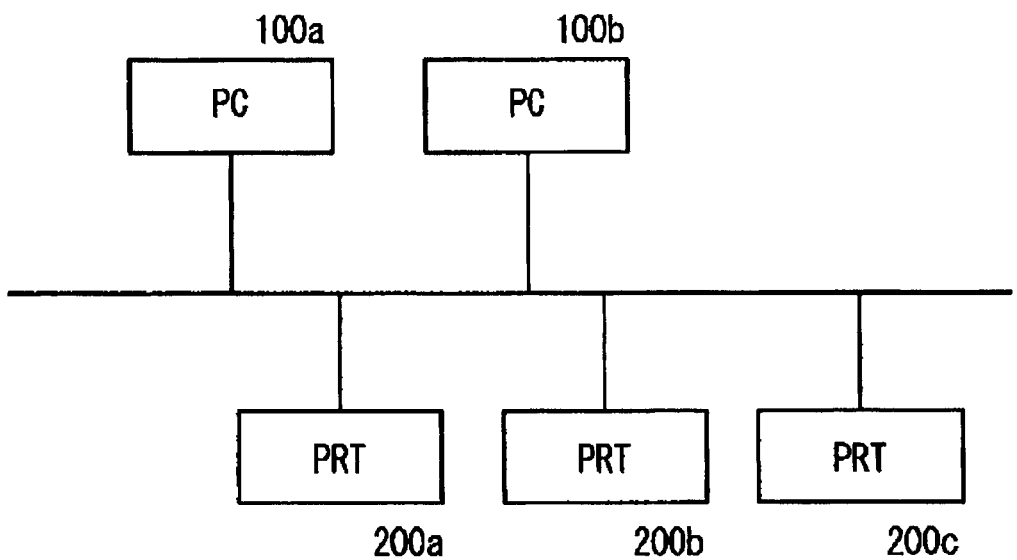
FIG. 1 is a drawing showing the construction of the network of one embodiment of the present invention.

An embodiment of the present invention is described below with reference to the drawings. Identical numbers in the drawings indicate the same or equivalent members, and explanations thereof will not be repeated.

FIG. 1 is a drawing showing a network including printers as well as personal computers in which the file management program which is one embodiment of the present invention is incorporated.

With reference to FIG. 1, connected to the network are personal computers 100a and 100b incorporating the file management program, and multiple printers 200a through 200c.

Figure 2:
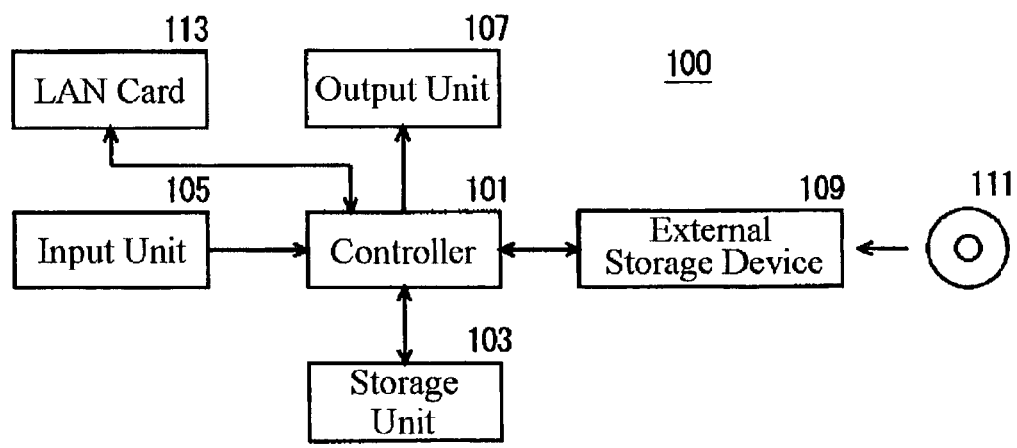
FIG. 2 is a drawing showing the construction of the personal computers 100a and 100b shown in FIG. 1.

FIG. 2 is a block diagram showing the basic construction of the personal computer 100a or 100b shown in FIG. 1. This personal computer functions as a file management apparatus when the file management program is installed thereon.

With reference to the drawing, the personal computer 100 includes a controller 101 to perform control of the entire apparatus, an input unit 105 to input data, a storage unit 103 to store data, an output unit 107 to output data, an external storage device 109 to store programs or the like that are executed by the controller 101, and a LAN (local area network) card 113 to connect to the network.

The controller 101 has a central processing unit (CPU), a read-only memory (ROM) to store programs that are executed by the CPU, and a random access memory (RAM) to store variables that are needed when the CPU executes a program.

The input unit 105 which is a keyboard and/or a mouse, and enables the input of letters, numbers and prescribed instruction commands.

The storage unit 103 stores such data as documents and images. Such data includes data files created using a word processing application program, data files created using a spreadsheet application program, data files to store images read by, for example, a digital camera or an image scanner, or data files created using various other application programs.

The storage unit 103 has multiple folders such that the data files are stored in different folders. For example, data files created using a word processing application may be stored in one folder A, while data files created using a spreadsheet application may be stored in a different folder B. Furthermore, it is also acceptable if a folder is created for each subject matter, or if a folder is created every certain period based on the date on which the data file is created. These folders are created using a public-domain operating system, file management program or application program.

The output unit 107 is a display, and displays the data files as thumbnails in accordance with instructions from the controller 101. Consequently, multiple data files can be displayed simultaneously.

The external storage device 109 reads the programs or data stored in the computer-readable recording medium 111 and sends them to the controller 101. It also writes necessary data onto the computer-readable recording medium 111 based on instructions from the controller 101.

For the computer-readable recording medium 111, a tape such as a magnetic tape or a cassette tape, a disk such as a magnetic disk (flexible disk, hard disk device, etc.) or an optical disk (CD-ROM, MO, MD, DVD, etc.), a card such as an IC card (including a memory card) or an optical card, or a medium that carries a program in a fixed fashion such as a mask ROM, an EPROM or a semiconductor memory including a flash memory, may be used. The recording medium 111 may also be a medium that carries a program in a fluid fashion such that the program can be downloaded from the network.

The controller 101 can execute the file management program recorded on the recording medium 111 by reading it using the external storage device 109.

Figure 3:
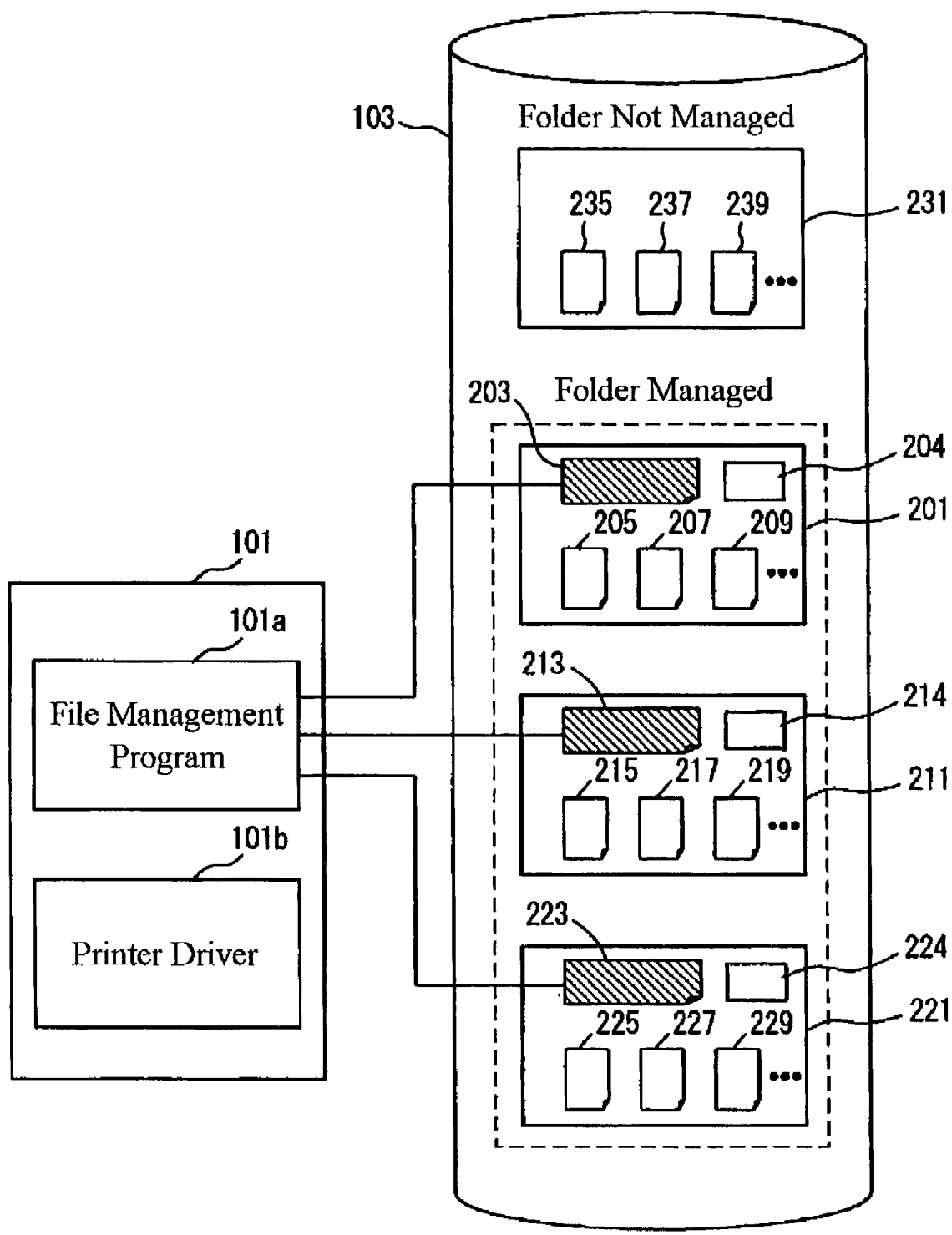
FIG. 3 is a drawing showing the file construction in the personal computer.

FIG. 3 is a drawing showing the file construction in the personal computer. With reference to FIG. 3, executed in the controller 101 are the file management program 101a and a printer driver 101b. Four folders 201, 211, 221 and 231 are included in the storage unit 103. Multiple data files are classified into the folders 201, 211, 221 and 231, respectively. Here, explanations will be provided regarding a situation in which the folder 231 is a folder that is not managed by the file management program, while the folders 201, 211 and 221 are managed by the file management program.

In FIG. 3, data files 205, 207, 209, etc. are stored in the folder 201, data files 215, 217, 219, etc. are stored in the folder 211, data files 225, 227, 229, etc. are stored in the folder 221, and data files 235, 237, 239, etc. are stored in the folder 231.

In addition to the data files, management information files 203, 213 and 223 and print management tables 204, 214 and 224 are stored respectively in the folders 201, 211 and 221, which are managed by the program. On the other hand, only data files 235, 237, 239, etc. are stored in the folder 231, which is not managed by the program, and no management information files or print management tables are stored therein.

The management information files 203, 213 and 223 are created by the file management program 101 that is executed by the controller 101. Each management information file includes file information for the data files that are classified under and stored in the folder in which the management information file is stored. For example, regarding the folder 201, the management information file 203 includes file information for the data files 205, 207, 209, etc. Regarding the folder 211, the management information file 213 includes file information for the data files 215, 217, 219, etc., and regarding the folder 221, the management information file 223 includes file information for the data files 225, 227, 229, etc. File information includes attribute information and additional information pertaining to the data files. Using the file information, multiple files may be virtually combined or removed from virtual combination via the file management program.

Recorded in the print management tables 204, 214 and 224 included in the managed folders 201, 211 and 221, respectively, is information regarding the printing of the data files included in each folder. This printing information indicates the printing format such as mode settings, for example.

Figure 4:
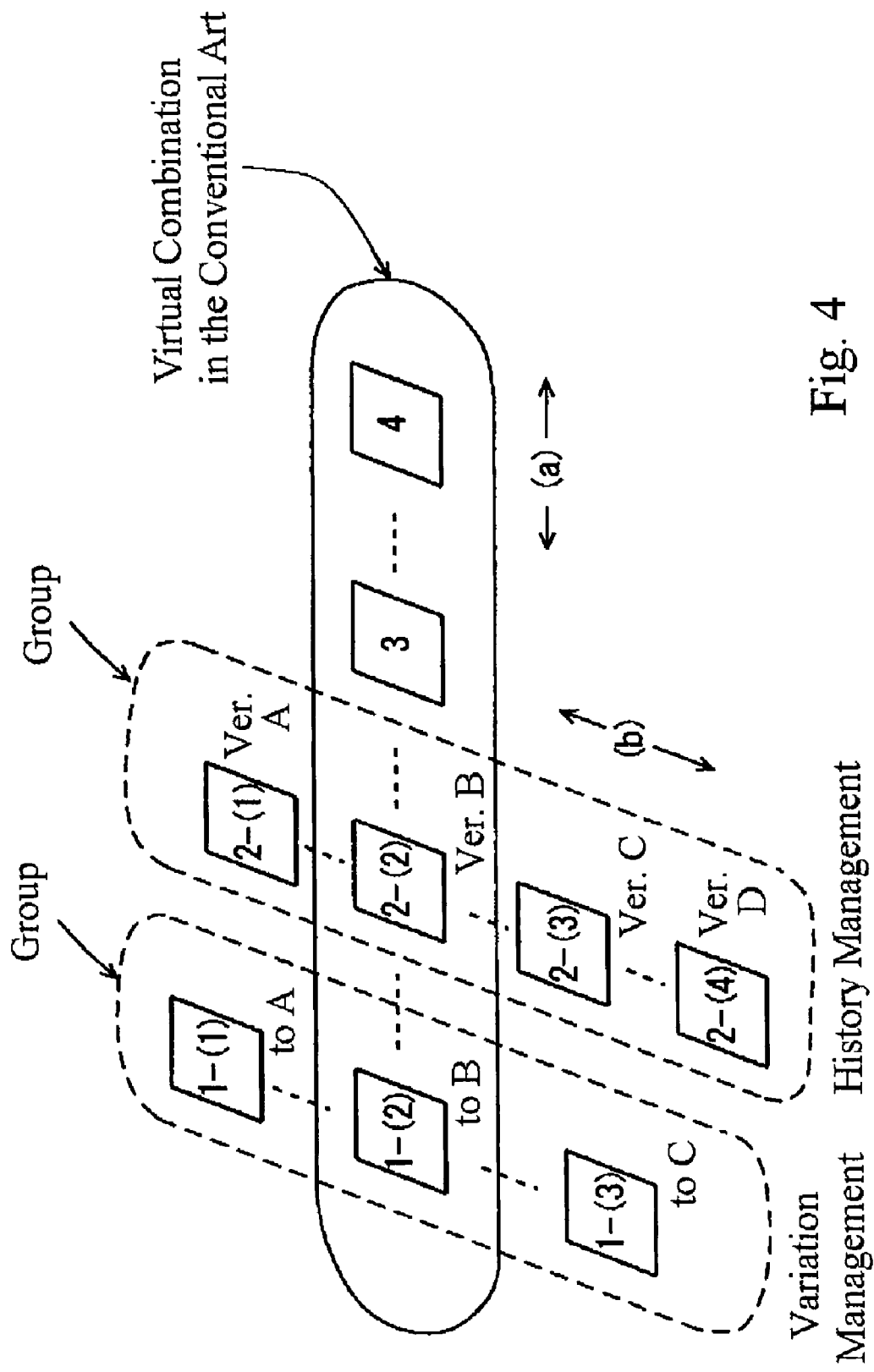
FIG. 4 is a drawing by which to explain a specific example of virtual combination and grouping.

FIG. 4 is a drawing by which to explain the concepts of file combination and grouping.

With reference to the drawing, it is assumed that files 1-(2), 2-(2), 3 and 4 are virtually combined in that order. This is the same combination as the virtual combination in the conventional art. The directions of the virtual combination are shown by the two-headed arrow (a).

The file 1-(2) and the related files 1-(1) and 1-(3) are grouped together. The file 2-(2) and the related files 2-(1), 2-(3) and 2-(4) are grouped together. The directions of grouping are shown by the two-headed arrow (b).

Here, the files 1-(1) through 1-(3) are document files indicating an invoice to company A, an invoice to company B and an invoice to company C, respectively. Because the files 1-(1) through 1-(3) are different from each other only in that part of the file content (such as the addressee) is different, it is more convenient if they are managed as a group. Therefore, the files 1-(1) through 1-(3) are grouped together.

Because the files 1-(1) through 1-(3) are files having partially different contents (i.e., are variations of each other), grouping them for management purposes is termed 'variation management'.

The files 2-(1) through 2-(4) are aligned in the order of revision. Managing the file revision history by grouping the files as in the case of the files 2-(1) through 2-(4) is called 'history management'.

Figure 5:
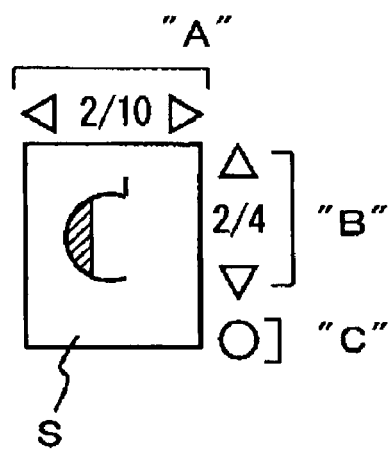
FIG. 5 is a drawing showing a display example of a virtual combination file.

FIG. 5 is a drawing showing a virtual combination file displayed on the screen. With reference to the drawing, when a virtual combination file is displayed, one of the component files is displayed as a thumbnail S. The user performs operations to this thumbnail or to the area surrounding the thumbnail using a mouse or the like in order to view or operate the virtual combination file as well as to perform variation management operations and/or history management operations.

The virtual combination file shown as an example in FIG. 5 is a combination of ten files.

The part 'A' in FIG. 5 indicates the number of files including the virtual combination file (ten in this example), and the file among such files currently being displayed as a thumbnail S (the second file in this example). Here, '2/10' is displayed. By clicking on the triangular arrows in the part 'A', the user can freely change the file displayed as a thumbnail S.

The part 'B' shows the number of files grouped together in connection with the file being displayed as a thumbnail S (four files in this example), and the information that shows the file among such files that is currently being displayed as a thumbnail S (the second file in this example). Here, '2/4' is displayed.

The part 'B' is not displayed when there are no files that are grouped together with the file being displayed as a thumbnail S. By clicking on the triangular arrows in the part 'B', the user can sequentially change the file displayed as a thumbnail S within the group.

The user can learn that the virtual combination file includes ten files and that the second file among them is being displayed by viewing the display shown in FIG. 5. In addition, the user can learn that there are three other files grouped together with the second component file of the virtual combination file and that a total of four files are grouped together.

The part 'C' is displayed when the file being displayed as a thumbnail S has other files that are grouped together therewith. Where the file currently being displayed as a thumbnail S is a component file of a virtual combination file (i.e., where the file is either the file 1-(2) or 2-(2) in FIG. 4), a white circle is displayed in the part 'C', and where it is not a component file of a virtual combination file, a black circle is displayed.

The user can make the file being displayed as a thumbnail S a component file of a virtual combination file by clicking on the part 'C'. In other words, the file being displayed as a thumbnail S when 'C' is clicked on is incorporated into the virtual combination file in place of the file that was part of the virtual combination file within that group up to that point.

Figure 6:
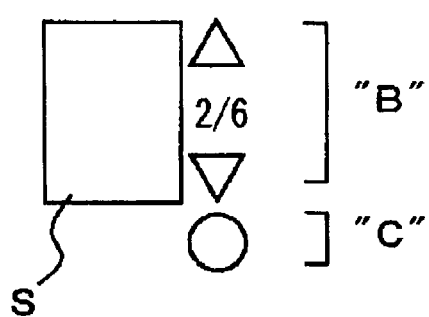
FIG. 6 is a drawing showing a display example of a virtual combination file.

FIG. 6 is a drawing showing a virtual combination file being displayed on the screen. Here, only one file indicates the virtual combination, and five files are grouped together therewith (i.e., a total of six files are grouped together).

In this case, the part 'A' shown in FIG. 5 is not displayed. The user can learn by viewing the part 'B' that this file belongs to a group which is a total of six files, and that the second file among such files is being displayed as a thumbnail S.

Figure 7:
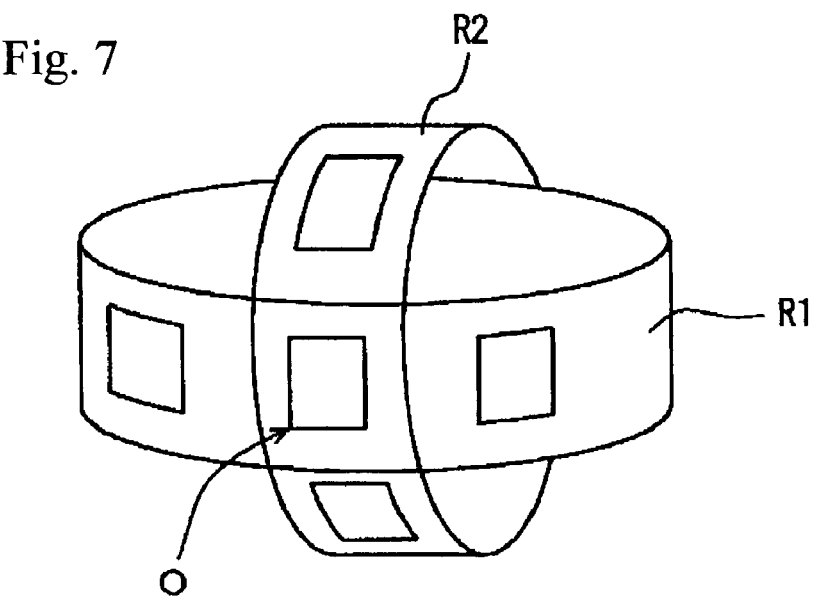
FIG. 7 is a drawing showing a display example of a virtual combination file.

FIG. 7 is a drawing showing another display example of a virtual combination file. With reference to the drawing, the display includes a ring R1 and a ring R2. The ring R1 displays the files that indicates a virtual combination. The file that is the object of operation is displayed at the center (O) as a thumbnail. The files before and after the file of the object of operation are displayed on both sides of the center (O). The ring R2 is displayed when there are files that are recorded as belonging to the same group as the file being displayed at the center, and displays the thumbnails of the files in that group.

The user can rotate the ring R1 to the right or to the left via the operation of the mouse or the like, and can display different files indicating the virtual combination at the center. In other words, this operation is performed to change the display of the file in the directions (a) of FIG. 4, and is equivalent to the operation of the part 'A' of FIG. 5.

In addition, the user can rotate the ring R2 upward or downward via the operation of the mouse or the like, and can display different files in the group at the center. In other words, this operation is performed to change the display of the file in the directions (b) of FIG. 4, and is equivalent to the operation of the part 'B' of FIG. 5.

FIG. 8 is a drawing showing the contents of the management information file (see keys 203, 213 and 223 in FIG. 3). With reference to the drawing, recorded in the management information file are the display flag, the combination file, the virtual combination flag, the ordinal position in the virtual combination file, the ordinal position in the variation or history management, and the type of management, such that these information items are associated with each file name.

In the example of FIG. 8, five files having the file names A.DOC, B.XLS, REV1_C.PPT, REV_C.PPT and REV3_C.PPT make one set, while three files having the files names VAR_A.TXT, VAR_B.TXT and VAR_C.TXT make another set.

The file having the 'display flag' 1 is the file to be displayed on the screen as a thumbnail. The 'combination file' indicates the number by which to identify the file set. In this example, file sets are differentiated from each other by '1' and '2'.

Those having '1' for the 'virtual combination flag' are virtual combination file component files. In other words, in this example, A.DOC, B.XLS and REV1_C.PPT make a first virtual combination file, and VAR_B.TXT make a second virtual combination file.

The 'ordinal position in virtual combination file' indicates the ordinal position of the file regarding virtual combination. The 'ordinal position in variation/history management' indicates the ordinal position assigned to the file within the group. The 'type' indicates whether the file that belong to a group of an object of history management or an object of variation management.

Figure 9:
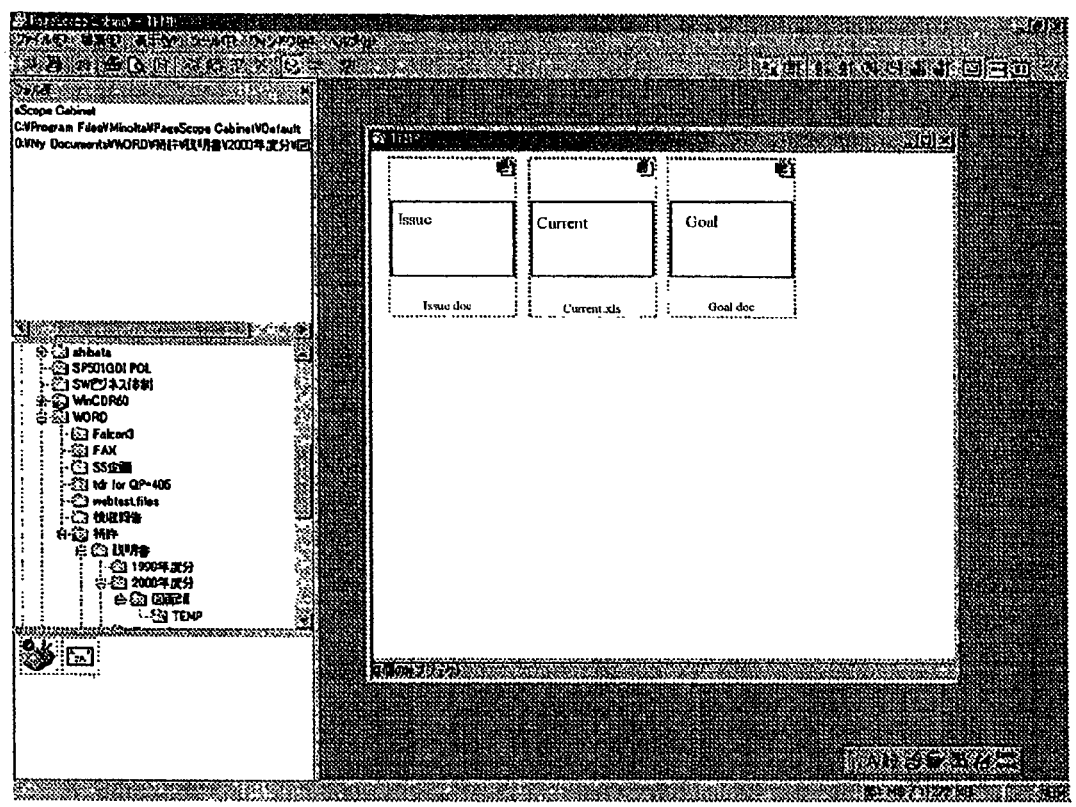
FIG. 9 is a drawing showing the state of files before virtual combination.

FIG. 9 is a drawing showing the screen that is displayed during virtual combination processing.

As shown in FIG. 9, a situation is assumed here wherein multiple files 'Issue', 'Current' and 'Goal' are recorded in one folder, and these three files will be virtually combined.

The names of each file are 'Issue.doc', 'Current.xls' and 'Goal.doc'. Furthermore, it is assumed here that the user drags and drops the 'Current' file onto the 'Goal' file. When this is done, the contextual menu shown in FIG. 10 is displayed, such that the user may select a desired item from the menu.

Figure 10:
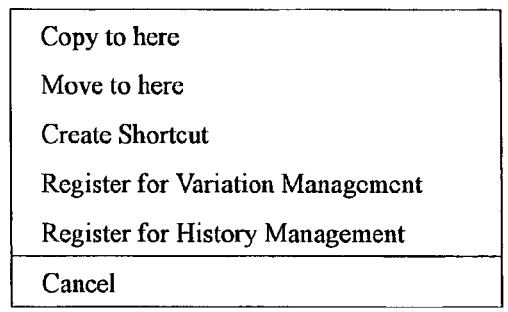
FIG. 10 is a drawing showing a contextual menu that is displayed when files are virtually combined or grouped.

With reference to FIG. 10, the contextual menu includes such items as 'Copy here', 'Move here', 'Create shortcut here', 'Register for variation management', 'Register for history management' and 'Cancel'.

Where the user selects 'Copy here' or 'Move here', a virtual combination file is created in the order of 'Current' and 'Goal'. On the other hand, where the user selects 'Register for variation management' or 'Register for history management', the two files are grouped together in the order of 'Current' and 'Goal'. Here, it is assumed that the user has selected 'Move here' and a virtual combination file has been created in the order of 'Current' and 'Goal'.

The user further drags and drops the 'Issue' file on the created virtual combination file. If the user selects 'Move here' from the contextual menu shown in FIG. 10 here as well, a virtual combination file is created in the order of 'Issue', 'Current' and 'Goal'. The user can assign a file name to the virtual combination file, and here it is assumed that the file name 'Report' is used.

The file names of the files that indicate the virtual combination, the order of virtual combination and the file name of the virtual combination file are recorded in the management information file.

Figure 11:
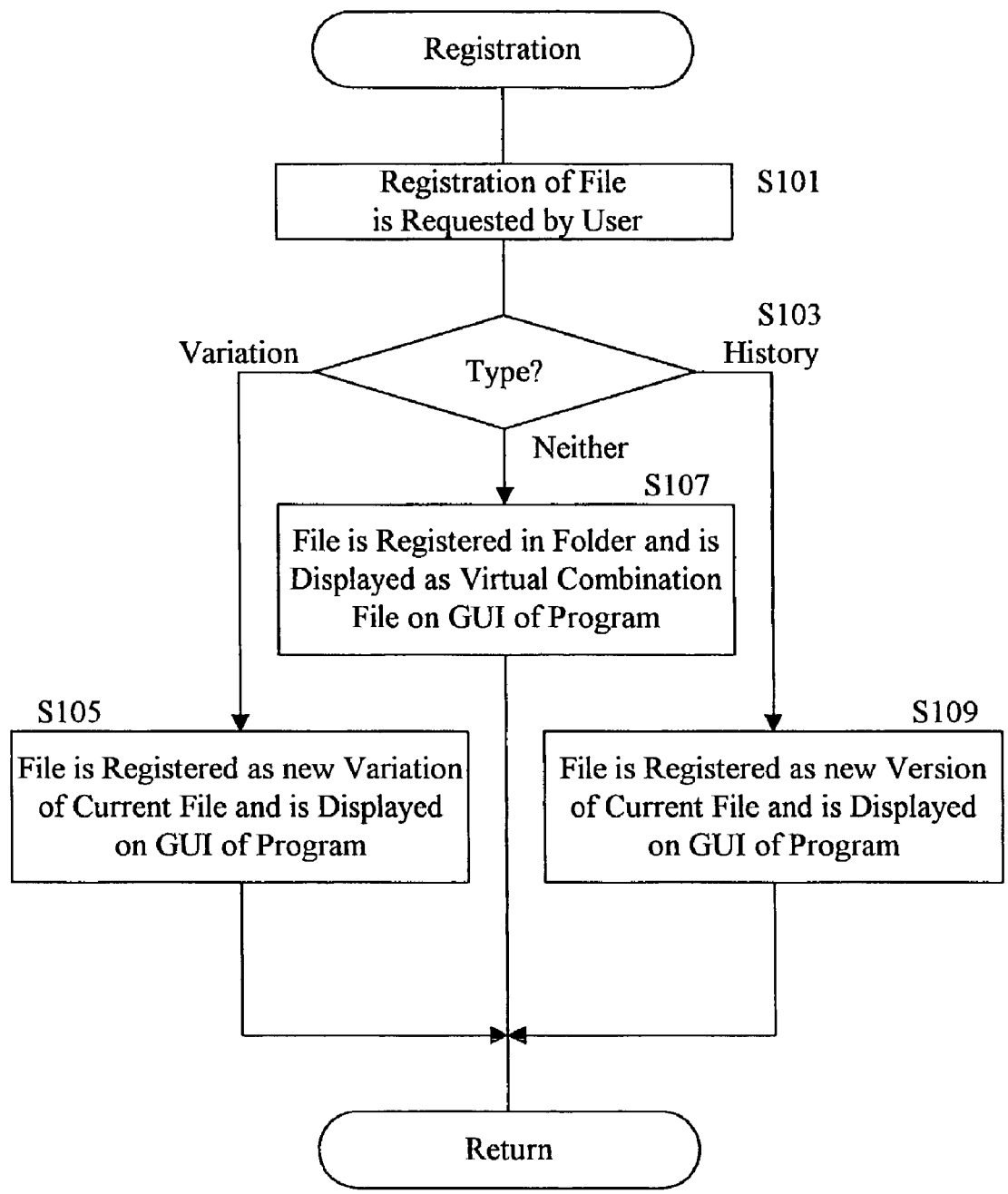
FIG. 11 is a flow chart showing the sequence performed when files are virtually combined or grouped.

FIG. 11 is a flow chart that shows the sequence performed when a file is registered via virtual combination or as belonging to a group.

With reference to FIG. 11, where the user has requested registration of the file as belonging to a group or via virtual combination by dragging and dropping it in step S101, processing is carried out in step S103 based on the management method for that file.

Where the file is registered for variation management, the file is registered (grouped) in step S105 as a new variation of the file currently being displayed as a thumbnail. That file is displayed on the GUI of the file management program.

Where history management is selected, the file is registered (grouped) in step S109 as a new version of the file currently being displayed as a thumbnail (i.e., a new addition to file history), and that file is displayed on the GUI of the file management program.

Where neither management is to be performed, the file is registered as a file that indicate a virtual combination file component in step S107, and is displayed on the GUI of the file management program.

Figure 12:
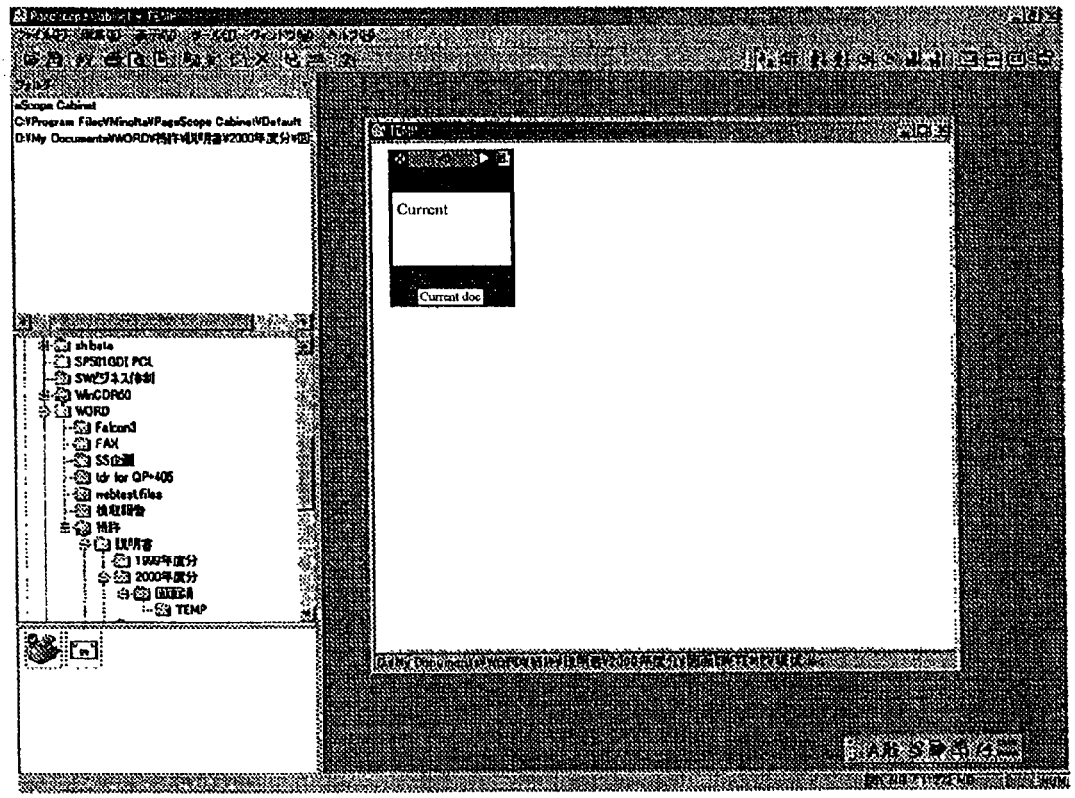
FIG. 12 is a drawing showing the state of files after virtual combination.

FIG. 12 is a drawing showing the situation after the three files in FIG. 9 have been virtually combined. With reference to the drawing, while the contents of the file 'Current' are being displayed as a thumbnail of the virtual combination file, by clicking on the part displayed above the thumbnail (i.e., the part 'A' in FIG. 5), the user can view the outlines of the files 'Issue' and 'Goal' as if leafing through pages.

Because no grouped files exist here, the parts 'B' or 'C' in FIG. 5 are not displayed in FIG. 12.

The user can delete or remove the file displayed as a thumbnail from variation management or history management by selecting it using the mouse.

Figure 13:
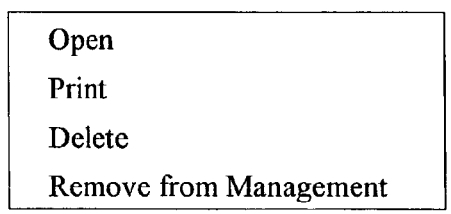
FIG. 13 is a drawing showing a contextual menu for file operation.

More specifically, by selecting the file being displayed as a thumbnail using the mouse and right-clicking the mouse, the contextual menu shown in FIG. 13 is displayed.

With reference to FIG. 13, the contextual menu includes the items 'Open, 'Print', 'Delete' and 'Remove from management', and the user can select any desired item from among these items.

Where 'Delete' is selected, the file is deleted. Where 'Remove from management' is selected, the information regarding that file is removed from the management information file, and the file name of the file is changed, thereby removing the file as an object of management.

Figure 14:
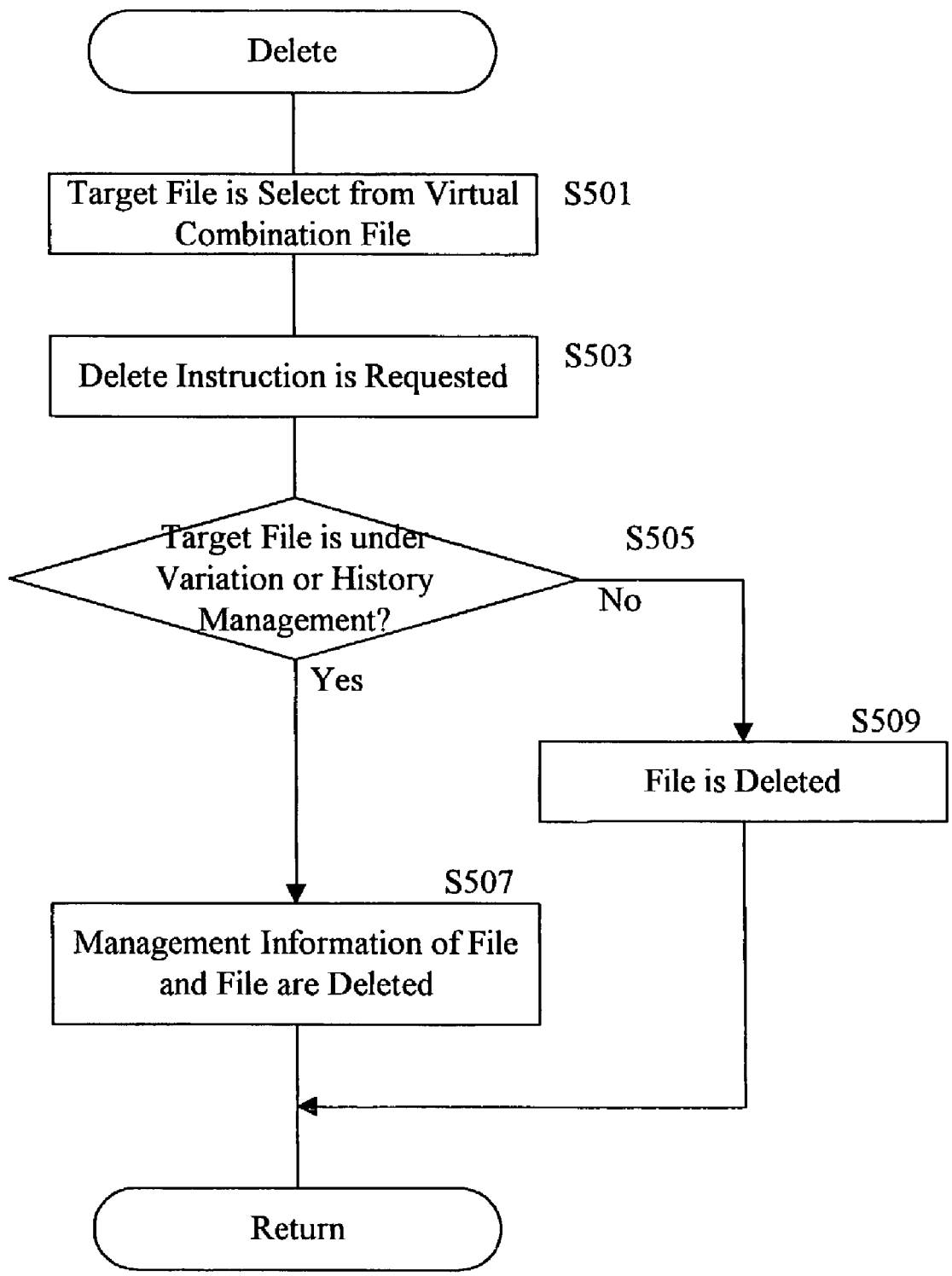
FIG. 14 is a flow chart showing the sequence performed when a file is deleted.

FIG. 14 is a flow chart showing the sequence performed when a file is deleted. With reference to the drawing, where a target file is selected from the virtual combination file in step S501 and the user issues a delete instruction in step S503, it is determined in step S505 whether or not the file of the object of deletion is under variation management or history management. If the answer is 'YES', the information regarding the file to be deleted, which is recorded in the management information file, and the selected file are deleted from the memory in step S507.

It is acceptable if only the selected file is removed here, but it is also acceptable if all of the files grouped together with the selected file are removed.

If the answer is 'NO' in step S505, the file is deleted in step S509.

Figure 15:
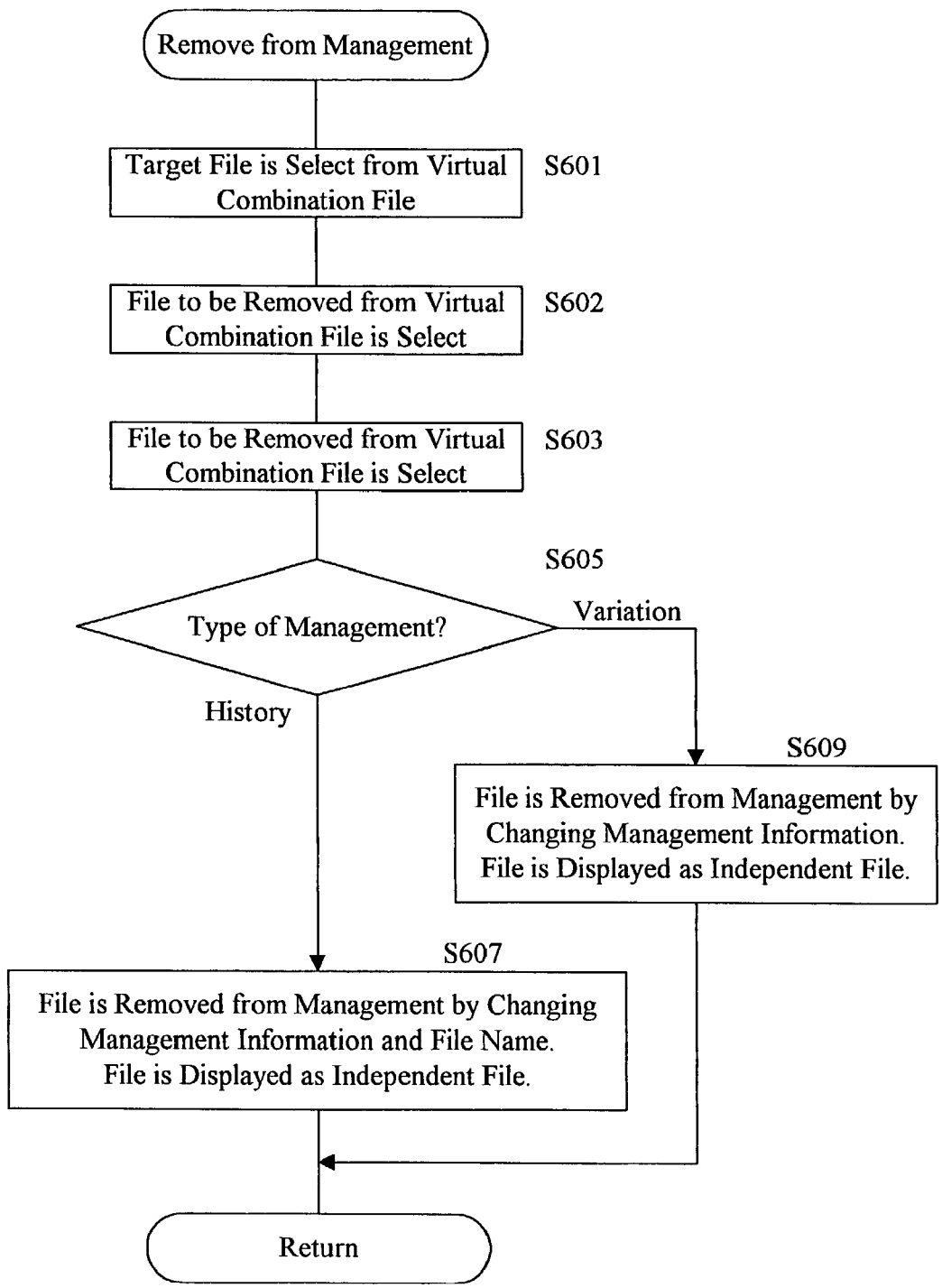
FIG. 15 is a flow chart showing the sequence performed when a file is removed from management.

FIG. 15 is a flow chart showing the sequence performed when 'Remove from management' is selected by the user in the screen shown in FIG. 13.

With reference to FIG. 15, the target file is selected from the virtual combination file in step S601, and the file to be removed from management is selected from this file by the user in step S602. Where an instruction to remove the file from management is issued in step S603, the management method for the target file is determined in step S605. If the management method is history management, the file is removed from management by changing the management information file in step S607. In addition, the file name is changed and the file is displayed as an independent file. This change of the file name is carried out by adding 'RevN_' at the beginning of the original file name. Here, N is a number that indicates the version of the file. More specifically, where the original file name is 'Sample.doc' and the file is a third version, the original file name removed from management is changed to 'Rev_Sample.doc'.

Where the management method for the target file is variation management in step 605, the management information file is changed in step S609, and the file is displayed as an independent file.

As described above, in this embodiment, files that are related to at least some of the files among the files that indicate a virtual combination are grouped and managed together. The user can freely select a file that will be a component file of the virtual combination file from among the grouped files.

The file management program of this embodiment can be used for the following applications.

To virtually combine weekly reports of individuals to create a group weekly report. The history management function enables storage and viewing of past individual weekly reports.

To virtually combine reference materials created by individuals in order to create a set of reference materials. The history management function enables monitoring of the progress of reference material creation.

To prepare several cover page versions for the reference material by addressee and assemble them as one file via the variation management function so that the most appropriate version can be used for the occasion.

The embodiment disclosed herein is an example in all aspects and does not limit the implementation of the present invention in any way. The scope of the present invention is indicated not by the description provided above but the claims, and all changes and modifications within the meaning and scope equivalent to the claims are intended to be included.

What is claimed is:

1. A computer program that causes a computer to execute a file management program, comprising the steps of:
   combining multiple files into a combination file based on information that indicates a relationship among the multiple files in a first dimension (first combining);
   combining at least one file, which is a component of the combination file, and other files that are related to said file in a second dimension different from said first dimension. (second combining); and
   storing in a single management file information regarding the files combined in the first combining step and their relationship in the first dimension, and the files combined in the second combining step and their relationship in the second dimension.

2. The computer program according to claim 1, wherein the first combining is freely set by a user, and the second combining is performed based on a file history.

3. The computer program according to claim 1, wherein the first combining is freely set by a user, and the second combining is performed based on file variations.

4. The computer program according to claim 3, wherein the variations are defined by multiple files that partially share the same content.

5. The computer program according to claim 1, further comprising a step of, when one file of the combined files is instructed to be deleted, deleting files that are related to and combined with the instructed file.

6. The computer program according to claim 1, further comprising steps of:
   accepting an instruction to select one file from among the combined files by a user; and
   the combination of files is modified such that said selected file is included in the combination file created in said first combination step.

7. The computer program according to claim 1, further comprising a step of displaying contents of the file as a thumbnail and displaying an operation unit to switch a thumbnail displayed to thumbnails of other files combined in the first combining or the second combining.

8. A computer-readable recording medium on which the computer program for file management according to claim 1 is stored.

9. A method for file management in a computer system, comprising steps of:
   combining multiple files into a combination file based on information that indicates a relationship among the multiple files in a first dimension (first combining);
   combining at least one file, which is a component of the combination file, and other files that are related to said file in a second dimension different from said first dimension (second combining); and
   storing in a single management file information regarding the files combined in the first combining step and their relationship in the first dimension, and the files combined in the second combining step and their relationship in the second dimension.

10. A computer program that causes a computer to execute a file management program, comprising steps of:
    combining multiple files into a single combined file in response to an instruction from a user, to relate said files to one another in a first dimension;
    combining at least one file, which is a component of the combined file, and other files that are related to the one file in a second dimension different from said first dimension;
    combining and managing the files combined in the first combining and the files combined in the second combining; and
    displaying a representation of one file from among the multiple files in the combined file in a user interface that enables the user to navigate along said first dimension between the file displayed and other files of said combined file, and to navigate along said second dimension between the displayed file and other files of the second combining.

11. The computer program of claim 10, wherein said user interface includes the number of files in at least one of said first combining and said second combining.

12. The computer program of claim 11, wherein said user interface includes the number of files, respectively, in both of said first combining and said second combining.

13. The computer program of claim 11, wherein said user interface further includes the relative position of said one file among the files in the combining whose number is displayed.

14. The computer program of claim 10, wherein said user interface displays, in conjunction with the contents of said one file, a first control element that enables a user to navigate from said representation to representations of other files in said first combining and a second control element, different from said first control element, that enables the user to navigate from said representation to representations of other files in said second combining.

15. The computer program of claim 1, further including the steps of:
    displaying a representation of said one file; and
    displaying, in conjunction with said representation, a first control element that enables a user to navigate from said representation to representations of other files in said first combining and a second control element, different from said first control element that enables the user to navigate from said representation to representations of other files in said second combining.

16. The computer program of claim 15, wherein said control elements are displayed immediately adjacent said representation.

17. The computer program of claim 16 wherein said first and second control elements are respectively arranged along two different dimensions to represent two different combinings.

18. The computer program of claim 17 wherein each of said control elements comprises a pair of navigation arrows.

19. The computer program of claim 15 further including the step of displaying, in association with said first and second control elements, information that indicates the number of files in each of said first and second combinings, respectively.

20. The computer program of claim 19, wherein said information further indicates the relative position of said one file among the files in each of said groupings.

21. The computer program according to claim 15, wherein said representation comprises a thumbnail of the contents of the file and said first and second control elements cause the display of said thumbnail to switch to thumbnails of other files combined in the first combining or the second combining, respectively.

22. The method of claim 9, further including the steps of:
displaying a representation of said one file; and
displaying, in conjunction with said representation, a first control element that enables a user to navigate from said representation to representations of other files in said first combining and a second control element, different from said first control element that enables the user to navigate from said representation to representations of other files in said second combining.

* * * * *